Dec. 31, 1935.  G. C. HAMILTON  2,026,469
BUNDLING AND WRAPPING APPARATUS
Filed Oct. 2, 1931  9 Sheets-Sheet 1

Inventor
George C. Hamilton
By Mason Fenwick & Lawrence
Attorneys

Dec. 31, 1935.    G. C. HAMILTON    2,026,469
BUNDLING AND WRAPPING APPARATUS
Filed Oct. 2, 1931    9 Sheets-Sheet 3

Inventor
George C. Hamilton
By Mason Fenwick & Lawrence
Attorneys

Dec. 31, 1935.   G. C. HAMILTON   2,026,469
BUNDLING AND WRAPPING APPARATUS
Filed Oct. 2, 1931   9 Sheets-Sheet 4

Inventor
George C. Hamilton

Dec. 31, 1935. G. C. HAMILTON 2,026,469
BUNDLING AND WRAPPING APPARATUS
Filed Oct. 2, 1931 9 Sheets-Sheet 5

Inventor
George C. Hamilton
By Mason Fenwick & Lawrence
Attorneys

Dec. 31, 1935.  G. C. HAMILTON  2,026,469
BUNDLING AND WRAPPING APPARATUS
Filed Oct. 2, 1931  9 Sheets-Sheet 6

Inventor
George C. Hamilton
By Mason Fenwick & Lawrence
Attorneys

Dec. 31, 1935.  G. C. HAMILTON  2,026,469
BUNDLING AND WRAPPING APPARATUS
Filed Oct. 2, 1931   9 Sheets-Sheet 7

Dec. 31, 1935.   G. C. HAMILTON   2,026,469
BUNDLING AND WRAPPING APPARATUS
Filed Oct. 2, 1931    9 Sheets-Sheet 8

Inventor
George C. Hamilton
By Mason Fenwick Lawrence
Attorneys

Dec. 31, 1935.   G. C. HAMILTON   2,026,469
BUNDLING AND WRAPPING APPARATUS
Filed Oct. 2, 1931   9 Sheets-Sheet 9

Inventor
George C. Hamilton
Mason Fenwick Lawrence
Attorneys

Patented Dec. 31, 1935

2,026,469

UNITED STATES PATENT OFFICE 2,026,469

BUNDLING AND WRAPPING APPARATUS

George C. Hamilton, McComb City, Miss.

Application October 2, 1931, Serial No. 566,536

4 Claims. (Cl. 93—2)

The invention forming the subject matter of this application includes a method of, and apparatus for, wrapping, binding and printing commodities which are ordinarily formed in packages. Primarily the method and apparatus is concerned with the wrapping in paper, or similar sheet material, of lumber, molding, flooring, in odd or even lengths, and any and all products of sawmills and planing mills. The invention is not necessarily limited to the wrapping of planing mill material, as it may be used for the wrapping of commodities of other nature, such as metal rods, and the like. Furthermore, it may be used for the wrapping of wooden handles, such as mop handles, furniture squares, turnings, and all products of woodworking establishments.

The main object of the invention is to provide a method of, and apparatus for, performing the functions enumerated above with a minimum of manual labor; and to produce, as the result of the practice of the invention, bundles of material which are securely packaged and prepared for shipment from the factory to the place of use.

Other objects of the invention will become apparent as the detailed description thereof proceeds.

In the drawings:

Figure 2b is a section taken on the line 2b—2b of Figure 2a;

Figure 2c is a horizontal section taken on the line 2c—2c of Figure 2b;

Figure 1:
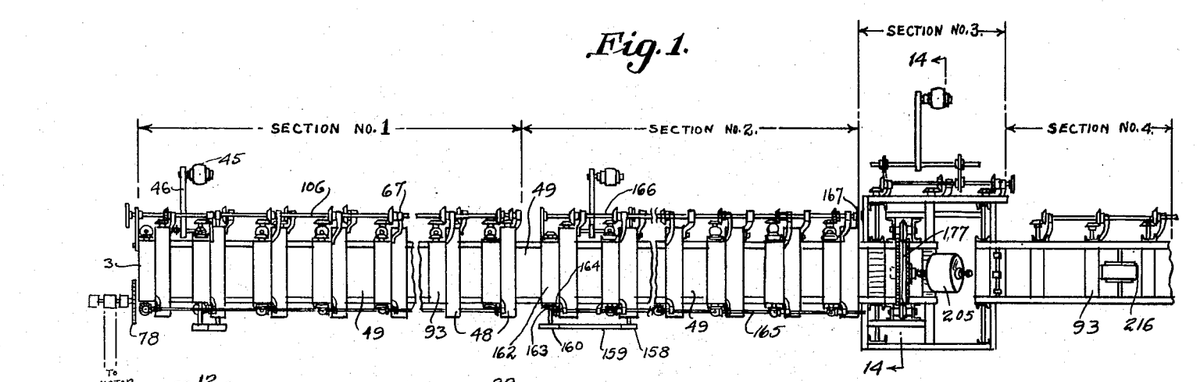
Figure 1 is a plan view of the apparatus employed in carrying out this invention.
Figure 2:
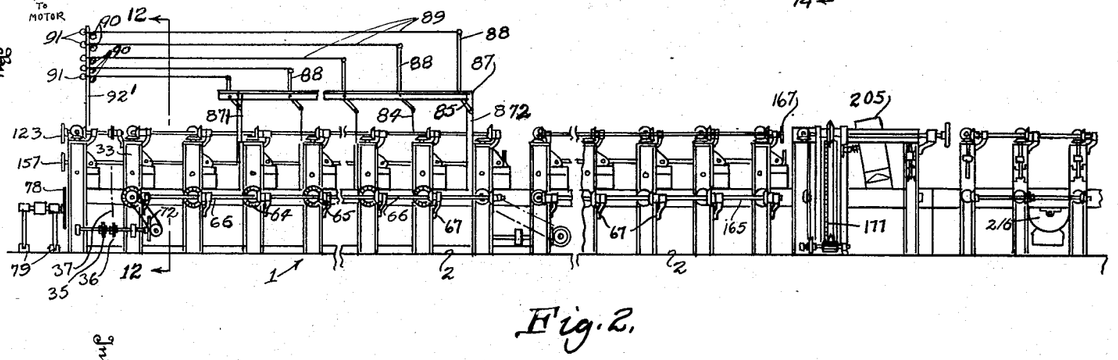
Figure 2 is a side elevation of the apparatus shown in Figure 1.
Figure 2A:
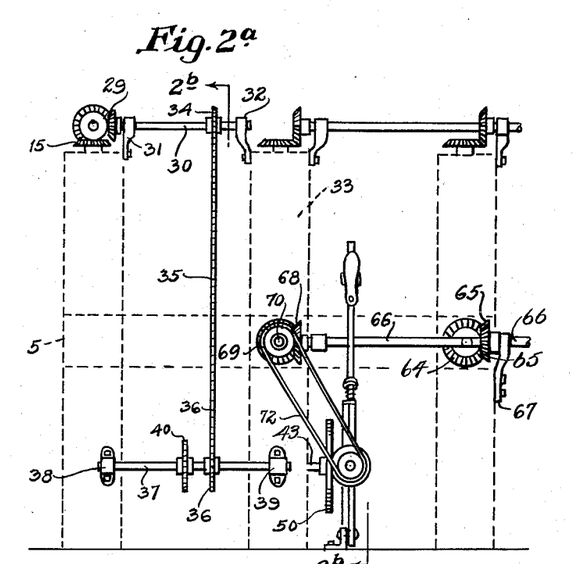
Figure 2a is a skeleton detail illustrating the drive mechanism for rotating the upper roller at the feed-in end of the apparatus and also illustrating a variable speed friction gear mechanism for rotating the rollers back of the feed-in roller at different speeds.
Figures 2B, 2C:
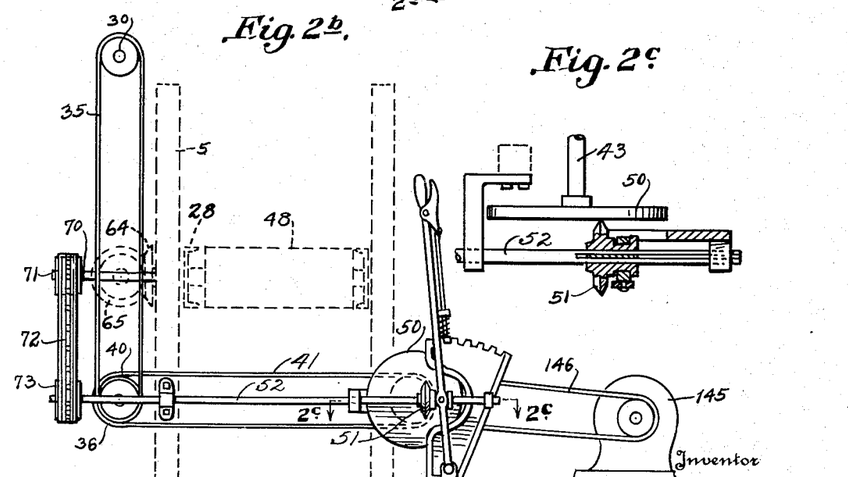

As shown in Figures 1 and 2 of the drawings, the conveyor mechanism of this system is divided into four sections, and these four sections are designed to be operated under the control of three different operators. The operator of section No. 1 attends to the feeding-in of the lumber to be packaged, and to the cutting off of this lumber to predetermined length. The operator of section No. 2 receives the assembled lumber from section No. 1, and controls the feed thereof into section No. 3, which may be termed the paper wrapping section. The second operator controls the operation of sections Nos. 2 and 3. Finally, an operator in section No. 4 receives the lumber in continuously wrapped bundles from section No. 3 and severs the continuously wrapped lumber into lengths which have been predetermined by the operator of the first section. In section No. 4, too, any printing or advertising matter desired to be impressed upon the paper covering is printed thereon as it is fed from the machine.

Referring now to Figures 1 and 2 of the drawings, it will be seen that the various elements of the conveyor mechanism are mounted between channel iron standards, forming part of the frame work 1 suitably supported on the floor or platform 2, and spaced apart at any convenient distance, depending upon the size of the apparatus, to support the rollers of the conveyor mechanism in proper relation to each other.

Figure 3:
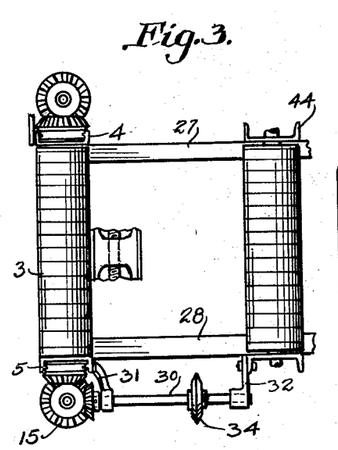
Figure 3 is a fragmentary detail plan view to an enlarged scale of the conveyor mechanism at the entrance end thereof.
Figure 4:
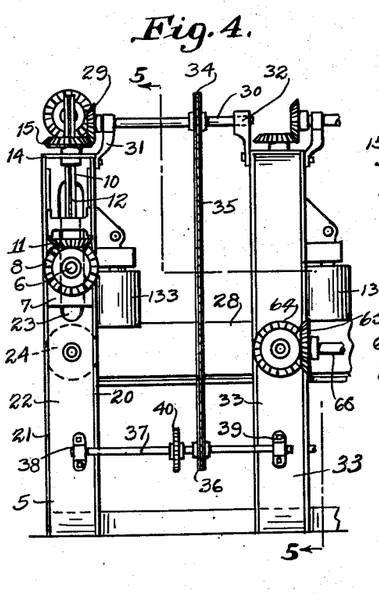
Figure 4 is a side elevation of the mechanism shown in Figure 3.
Figure 5:
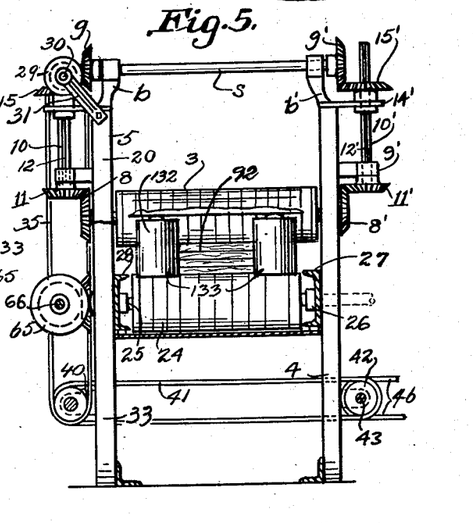
Figure 5 is a vertical transverse section taken on the line 5—5 of Figure 4.
Figures 6, 7:
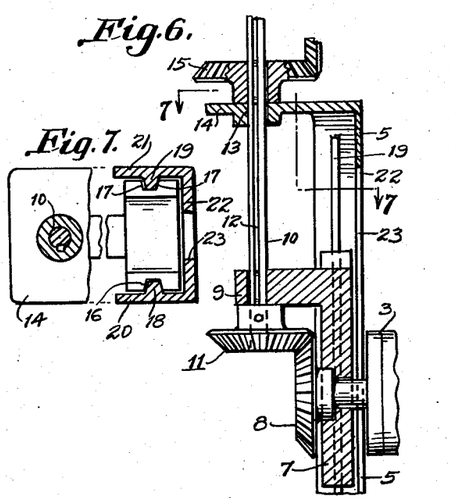
Figure 6 is a vertical section to an enlarged scale of upper roller adjusting mechanism illustrated on opposite sides of Figure 5.
Figure 7 is a fragmentary horizontal section taken on the line 7—7 of Figure 6.

The feed roller 3 at the feed-in end of the conveyor mechanism is journaled to slide vertically in the end standards 4 and 5 (see Figures 3 and 5). The shaft 6 on which the roller 3 is mounted is journaled in an angular bracket 7 (see Figure 6) and has bevel gear 8 secured to one end thereof. The horizontal flange 9 of the bracket 7 forms a journal bearing for a vertical shaft 10, having a bevel gear 11 secured to the lower end thereof and in mesh with the bevel gear 8. The shaft 10 projects above the flange 9 and is provided with a slot 12 extending throughout its length. This shaft 10 rotates freely in the bearing aperture 13 formed in a horizontally projecting flange 14 at the upper end of the standard 5. A bevel gear 15 is rotatably supported by the flange 14 and is provided with a key (not shown) projecting into the slot 12 for the purpose of imparting the rotation of the gear 15 to the shaft 10 and thence through the gears 11 and 8 and shafts 6 to the upper feed roller 3.

The bracket 7 is slidably mounted between the flanges of standard 5 and is provided at its opposite sides with grooves 16 and 17 which slide along tongues 18 and 19, suitably secured or formed integral with the flanges 20 and 21 of the standard 5. The web 22 of the standard 5 is provided with a slot 23 to receive the shaft 6 of the roller 3 and to permit the vertical movements of said shaft 6 and roller 3 on the standard 5. This roller supporting mechanism for the shaft 3 is duplicated on the standard 4, as will be apparent from Figure 5 of the drawings and the corresponding parts on standard 4 are designated by the same reference numerals primed. A shaft s journaled in bearing brackets b and b', at the top of standards 5 and 4, has bevel gears g and g' fixed to its opposite ends to transmit rotation from gear 15 to gear 15'.

The feed roller 3 is gravity controlled and is the only roller of the upper set of rollers which is power driven. The roller 24 immediately beneath the feed roller 3 is journaled to rotate freely in bearings 25 and 26 suitably mounted in the channel irons 27 and 28, which constitute the horizontal runners of the apparatus and are secured to the vertical standards parallel to form part of the frame work of the apparatus.

Figure 12:
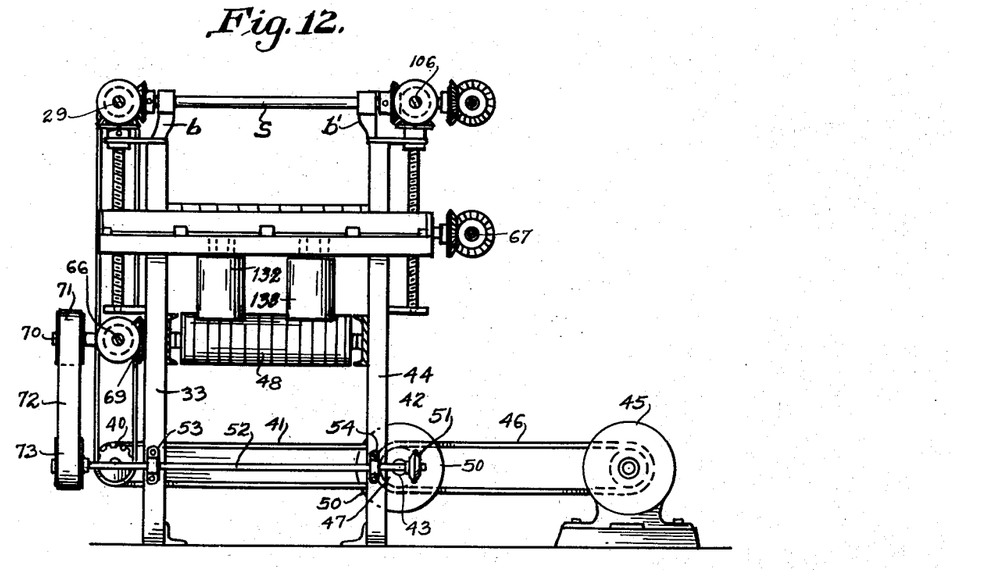
Figure 12 is a section taken on the line 12—12 of Figure 2.
Figure 13:
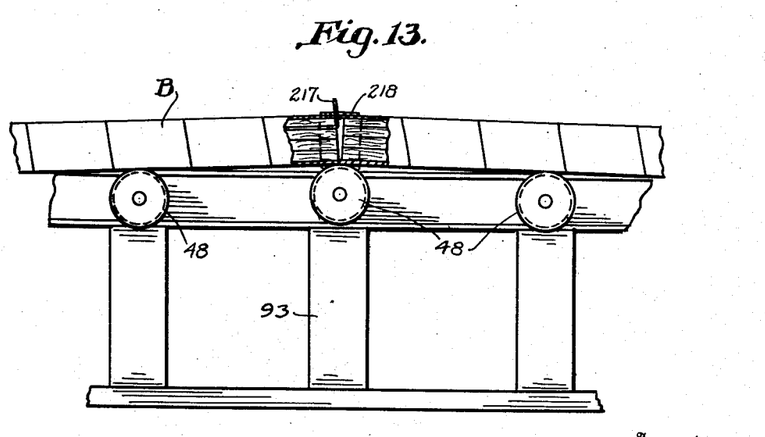
Figure 13 is a fragmentary side elevation of part of the conveyor mechanism at the delivery end thereof and illustrating a method of preparing adjacent joints of wrapped bundles for severance.
Figure 14:
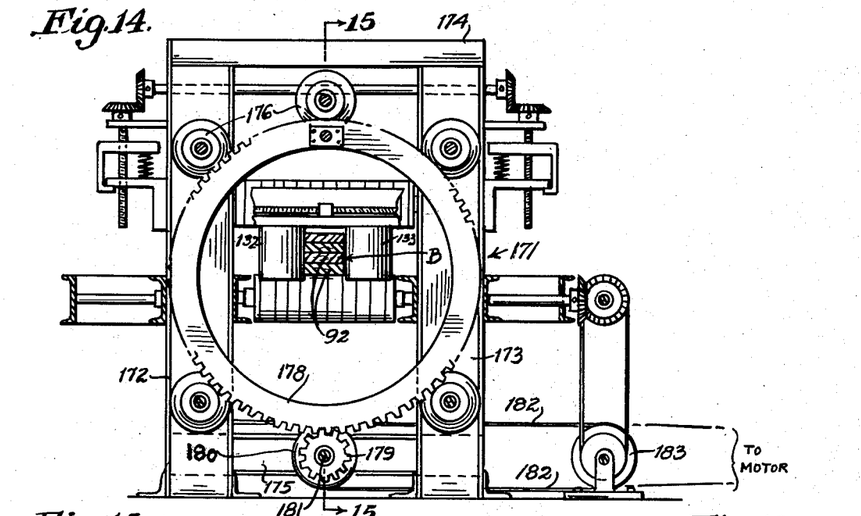
Figure 14 is a vertical transverse section taken on the line 14—14 of Figure 1.

The roller 3 is driven through the shaft 10 and bevel gear 15 by means of a bevel gear 29 meshing with gear 15 and secured to the end of a shaft 30. Journal brackets 31 and 32 are secured to the upper ends of standards 5 and 33 to receive the shaft 30 and this shaft has a sprocket 34 connected by a sprocket chain 35 (see Figure 2) to a sprocket 36 which is secured to a counter shaft 37 suitably journaled in bearing brackets 38 and 39 on the standards 5 and 33. The shaft 37 is rotated by means of the sprocket 40 which is conected by a sprocket chain 41 (see Figure 5) to a sprocket 42 on a countershaft 43 which is journaled in suitable bearing brackets secured to the standards 4 and 44. The shaft 43 may be rotated from any suitable driving means, such as the motor 45 illustrated in Figure 12, as connected by a sprocket chain 46 to a sprocket 47 secured to the said shaft 43.

A series of rubber covered rollers 48 are suitably journaled in bearings spaced apart along the runners 27 and 28 and the spaces between these rollers are filled in by plates 49 arranged slightly below the tops of said rollers 48 thereby forming a sort of a table having rollers spaced apart thereon for feeding the material along the conveyor mechanism. All the rollers 48 are driven in synchronism and at any desired speed by means of the adjustable friction drive illustrated in Figure 12 of the drawings. This friction drive comprises a friction disk 50 mounted on the end of the shaft 43 along with a friction wheel 51 which is slidably and non-rotatably mounted on a shaft 52 journaled in bearings 53 and 54 on the standards 33 and 44. The rubber coverings of rollers 48 are preferably circumferentially grooved, corrugated or fluted in order to insure proper gripping contact with irregular surfaces of moulded items being packaged.

The details of this friction drive are well known in the art and include mechanism for shifting the wheel 51 lengthwise on shaft 52 in order to adjust the friction wheel 51 toward and from the center of the friction disk 50. It is, of course, understood that this mechanism shall be under the control of the operator in section No. 1 in order to vary the rate of rotation of the rollers 48 as desired.

Figures 8, 9, 10, 11:
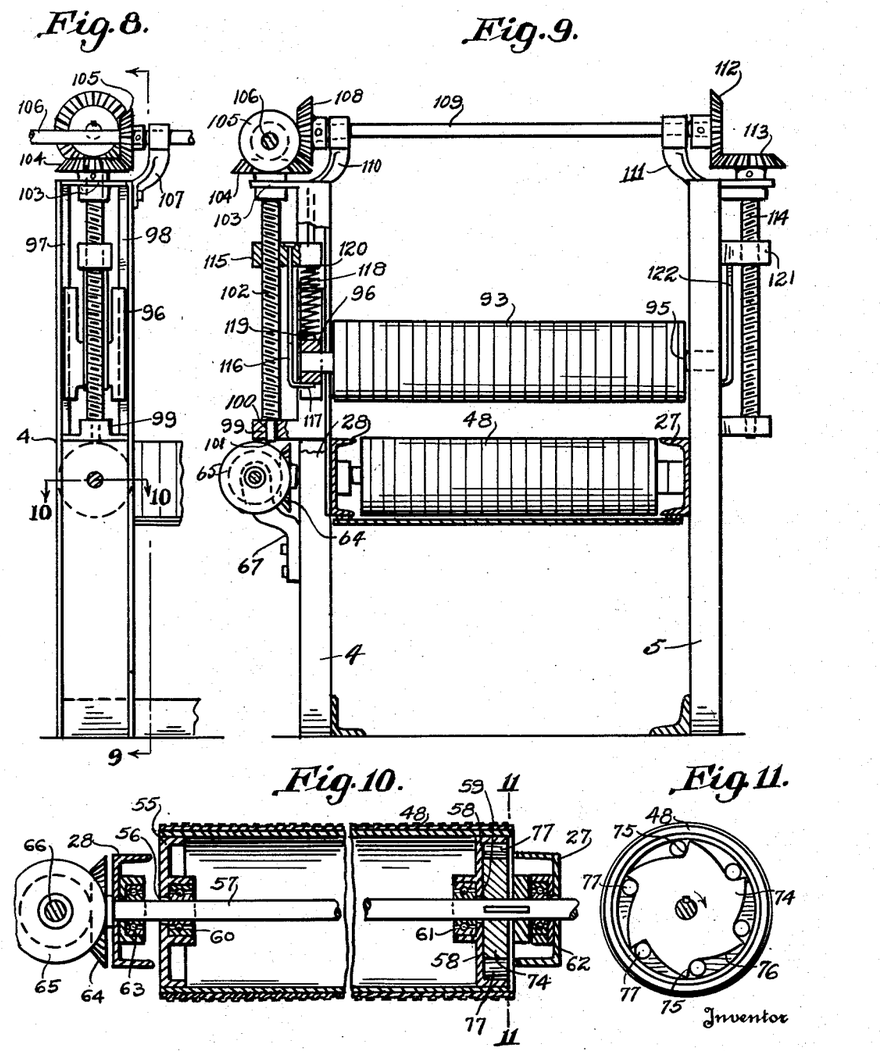
Figure 8 is a fragmentary side elevation of the conveyor mechanism illustrating the means for vertically adjusting the upper roller of the conveyor mechanism of this apparatus.
Figure 9 is a vertical transverse section taken on the line 9—9 of Figure 8.
Figure 10 is a central vertical section through one of the lower feed rollers of the conveyor mechanism.
Figure 11 is a section taken on the line 11—11 of Figure 10.

The rollers 48 are mounted so as to roll freely in their bearings when any material is pushed over the surface thereof; and clutch mechanism is mounted within each roller so that the shafts supporting them may rotate them positively in the same direction and at any desired speed. The peculiar mountings for these rollers are illustrated in Figures 10 and 11 of the drawings.

Each of the rollers 48 is made in the form of a hollow cylinder. One end of this cylinder is closed by a disk 55 which is provided with an aperture 56 through which passes a shaft 57. The other end of the roller 48 is closed by a flanged clutch cup 58 provided at its center with an aperture 59 to permit the free passage therethrough of the shaft 57. Ball bearings 60 and 75

61 are used as anti-friction members to allow the cylinder or roller 48 to rotate freely on the shaft 57.

The shaft 57 is journaled in ball bearings 62 and 63 suitably secured to the runners 27 and 28, respectively. The end of the shaft 57 where it projects through the runner 27 has a bevel gear 64 fixed thereto and in mesh with a beveled gear 65 suitably keyed on, or otherwise secured, to a shaft 66 journaled parallel to the runner 28 in suitable spaced apart bearing brackets 67 secured to the side of the standards carrying the runner 28. The shaft 66 is driven at various speeds of rotation by a bevel gear 68 which is keyed to said shaft 66 and in mesh with a bevel gear 69 secured to the shaft 70 of one of the rollers 48 near the feed-in end of the apparatus (see Figure 12). The shaft 70 projects beyond the bevel gear 69 and has a sprocket 71 fixed to the end thereof and in mesh with a sprocket chain 72 which is also in mesh with the sprocket 73 secured to the outer end of the variable speed shaft 52.

It will be evident from Figure 10 of the drawings, that so far as the mechanism already described is concerned, the roller 48 will rotate freely in either direction on the shaft 57. In order to control the rotation of the roller 48, the end of the shaft 57 remote from the gear 65 has a clutch plate 74 keyed thereon. The plate 74 is notched out as shown in Figure 11 to provide shoulders 75 and cam surfaces 76. In the recesses formed by the shoulders 75 and cam surfaces 76, the rolls 77 are seated. It will be apparent from Figure 11 that if the roller 48 be rotated clockwise while the shaft 66 remains stationary, the roller 48 will rotate freely on the rolls 77. If, however, the shaft 57 be rotated at a greater rate of rotation than the roller 48, the small rolls 77 on the left hand side of Figure 11 will act by gravity to grip the roller 48 rigidly to the clutch plate 74. It will be apparent from this mechanism that the operator of section No. 1 can speed up the rotation of shaft 57 to rotate the roller 48 at any desired speed. It will also be evident that when the shaft 57 is at rest, the roller 48 will rotate freely in the direction of the arrow and independently of shaft 57 to permit the free movement of any article carried thereby lengthwise of the conveyor.

The feed-in end of the conveyor mechanism is provided with any suitable kind of cross cut saw 78 which is mounted in the usual manner on any suitable swinging standard 79 to be swung across the feed-in end of the apparatus in order to cut off the end of the lumber projecting from the feed-in end of the conveyor mechanism. This cut off mechanism is old and well known in the art and is indicated only diagrammatically in Figures 1 and 2 of the drawings.

Figure 16:
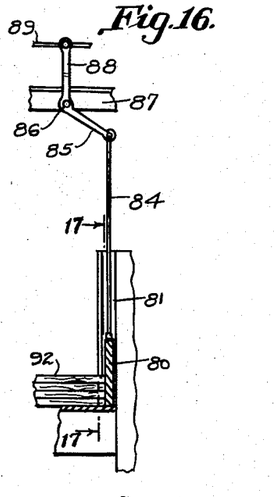
Figure 16 is a fragmentary detail of stop gate mechanism employed in this conveyor system for determining the lengths of bundles to be wrapped by this apparatus.
Figure 17:
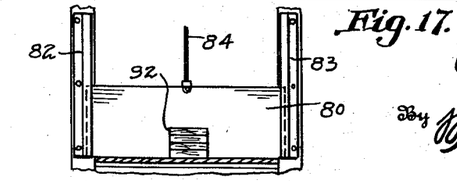
Figure 17 is a fragmentary elevation of the gate illustrated in Figure 16.

In order to regulate the lengths of the bundles of lumber to be wrapped by this apparatus, the frame work of section No. 1 is provided with a series of gates 80 (see Figures 16 and 17). These gates are spaced apart at different distances from the feed-in end of the apparatus and are designed to act as stops against which the lumber fed into the apparatus contacts in accordance with the length of the package desired. Each gate 80 is slidably mounted in grooves 81 formed by Z-shaped angle irons 82 and 83, suitably secured to standards on opposite sides of the framework. Each gate 80 has its upper edge connected by a cable 84 to one arm 85 of a bell crank pivoted at its elbow 86 to a supporting runner 87 suitably secured by standards 871 and 872 to the framework of the machine. The other arm 88 of the bell crank is connected by a cable 89 which extends over a pulley 90 adjacent the feed-in end of the apparatus to a ring 91 which may be used for pulling the gate 80 upwardly in its guide grooves and out of the way of the lumber 92 for which the said gate had previously acted as a stop. It will be understood, of course, that each gate is controlled by a separate cable, and that the ring at the end of each cable is adapted to be engaged by a separate hook mounted on the board 92' at the feed-in end of the machine. The gates, of course, fall by gravity and are stopped by contact with the upper faces of the runners 27 and 28 in the path of the lumber moving along the conveying rollers 48.

To hold the lumber firmly against the rollers 48 the apparatus is provided with a series of upper rollers 93 arranged above the rollers 48. Since these rollers 93 are identical with each other and are similarly mounted it will be sufficient to describe the construction and mounting of one of them in detail. The details of construction for this upper roller mechanism are illustrated fully in Figures 8 and 9 of the drawings.

The roller 93 has trunnions 94 and 95 projecting from opposite ends thereof. The trunnion 95 is rotatably mounted in a bearing block 96 which is grooved on its opposite edges to slide along the tongues 97 and 98 secured to the opposite flanges of the standard S (see Figures 8 and 9). A bracket 99 extends outwardly from the web of the standard S and is provided with a bearing aperture 100 in which is rotatably mounted a trunnion 101 formed at the lower end of the screw shaft 102 which extends vertically upward and parallel to the tongues 97 and 98 on the standard S.

The upper end of the screw shaft 102 is journaled in a bracket 103 extending laterally from the upper end of the standard 4; and the shaft 102 where it projects beyond the upper end of the bracket 103 is provided with a bevel gear 104 which meshes with a bevel gear 105 suitably keyed onto a shaft 106 which extends lengthwise of section No. 1 of the apparatus and is journaled in brackets 107 secured to the sides of the standards S at the upper ends thereof. The gear 105 is smaller in diameter than the gear 104 in order to clear a gear 108 which meshes with the gear 104 and is secured to one end of a shaft 109 which extends across the framework and is journaled in brackets 110 and 111 secured to the top of the standards 4 and 5.

The other end of the shaft 109 has the bevel gear 112 secured thereto; and this bevel gear meshes with a bevel gear 113 secured to the upper end of a screwthreaded shaft 114 oppositely screwthreaded but otherwise similar in every respect to the screwthreaded shaft 102 carried by the brackets 99 and 103 on the other standard S. The purpose of this construction is obviously to rotate the shafts 102 and 114 in opposite directions in order to raise and lower the roller 93.

The shaft 102 has a nut 115 threaded thereon, and this nut 115 has an L-shaped extension 116 depending therefrom and having its lower end 117 hooked under the bearing block 96 to raise and lower the same in accordance with the rotation of the shaft 102. The bearing block 106 is held yieldingly in contact with the end 117 by means of the coil spring 118 which is interposed between the upper part of the bearing block 96 and the lower face of the nut 115, pins 119 and 120 projecting from the aforesaid block and nut, respectively, to hold the spring 118 properly in position.

A nut 121 similar to the nut 115 is threaded onto the shaft 114 and is provided with an L-shaped extension 122 similar to the extension 116 for the same purpose. In other words, the lower end of the extension 102 hooks under a bearing block carrying the trunnion 95 and a spring similar to the coil spring 118 is interposed between the bearing block 95 and the nut 121 for the same purpose.

It will be evident that when the shaft 106 is rotated in one direction or the other, the roller 93 will be raised and lowered bodily on its supporting standards 4 and 5. The coil springs, of course, permit the rollers 93 to separate from the rollers 48 in accordance with the varying dimensions of the bundle gripped between the two rollers. A hand wheel 123 at the feed-in end of the apparatus may be operated to rotate the shaft 106 and thereby simultaneously adjust all the upper rollers 93 relative to the lower rollers.

To maintain the articles being packaged in vertical alignment during their passage between the rollers 48 and 93, the apparatus is provided directly behind each pair of rollers 48 and 93 with a pair of rollers rotatable about vertical axes and adapted to be moved simultaneously toward and from a vertical plane bisecting the rollers 48 and 93. These vertical rollers (see Figures 12, 25, 26, 27 and 28) are mounted to slide toward and from each other on a triangular crossbeam 126 secured to the back of the standards 4 and 5 back of rollers 48 and 93. The crossbeam 126 is provided with a bottom flange 127 which is provided with slots 128 and 129 to permit the sliding movements of the shafts 130 and 131 on which the vertical rollers 132 and 133 are mounted to rotate. The shafts 130 and 131 extend into blocks 134 and 135 grooved in their opposite edges to slide along tongues 136 and 137 formed on the rear wall of the crossbeam 126 and the front wall of a flange 138 extending upwardly from the bottom flange 127.

A bearing block 139 extends upwardly from the center of the bottom flange 127 to receive rotatably the inner ends of two rigidly connected oppositely threaded screws 140 and 141 which have their other ends journaled in bosses 142 and 143, respectively, formed on the outer end walls 144 and 145 of the crossbeam 126. A nut 146 is threaded on the screwthreaded shaft 140 and this nut has an extension 147 extending parallel to the shaft 140 and with one end 148 hooked over the block 135 which supports the upper end of the shaft 131. A coil spring 149 is interposed between the nut 146 and the block 135 to provide for yielding movement of the roller 133 toward the aforesaid nut 146.

A nut 150 is screwthreaded on the shaft 141 and has an extension 151 similar to the extension 147 hooked over the end of the block 134. A coil spring 152 is interposed between the nut 150 and the block 134 to provide for yielding movement of the roller 132 toward the nut 150.

The screwthreaded shaft 141 extends through the boss 143 and has a bevel gear 153 secured to the outer end thereof. This bevel gear 153 meshes with the bevel gear 154 which is secured to a shaft 155 extending lengthwise of the section No. 1 and directly below the shaft 106 which controls the raising and lowering of the rollers 93. The shaft 155 is journaled in brackets 156 extending from the end wall of the crossbeam 126; and is provided at the end near the feed-in with a hand wheel 157 whereby all the rollers 132 and 133 may be simultaneously adjusted toward and from each other.

Section No. 2 is substantially similar to section No. 1. However, a the lower rollers are power driven under the control of the operator in Section No. 2. The lower rollers are similar to those illustrated in Figures 9, 10 and 11, so that the operator may permit a package of lumber passed on from section No. 1 to travel freely along the rubber covered rollers of section No. 2, or to rest at any point in section No. 2; or he may adjust the friction drive mechanism to operate the shafts of the lower rollers to pull the package away at any desired speed from section No. 1. The friction drive for rotating the lower rollers of section No. 2 at any desired speed is suitably connected up to the pulley 158 connected by sprocket chain 159 to a sprocket 160 secured to one end of the shaft 161 for driving the first roller 162 of section No. 2.

The shaft 161 has a bevel gear 163 secured thereto and in mesh with a bevel gear 164 fixed to the end of the variable speed shaft 165 for driving all the lower rubber covered rollers of section No. 2. The gearing for driving these rollers is substantially the same as the gearing in section No. 1 and requires no further description. The shaft 166 at the other side of the apparatus in section No. 2 is rotated by a hand wheel 167 to adjust the upper rollers 168 of section No. 2 relative to the lower rollers 162. A shaft 169 parallel to the shaft 166 is operated by a hand wheel 170 through the usual gearing for adjusting the vertical rollers of section No. 2 toward and from each other. The operator of section No. 2 controls the feeding of the bundle of lumor other material to section No. 3 which may be termed the wrapping section for the package.

Figure 20:
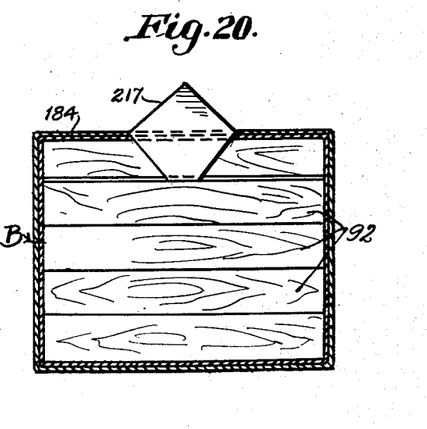
Figure 20 is an end view of a bundle of lumber immediately after wrapping and provided with a diamond shaped marker positioned to indicate the joint between adjacent wrapped bundles.
Figure 21:
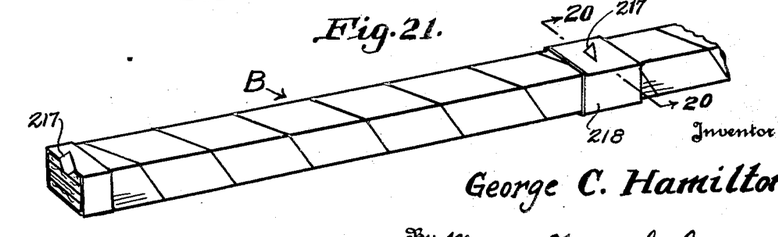
Figure 21 is a perspective view showing two completely wrapped bundles having adjacent ends connected to each other.

During the passage of the bundle along section No. 2, the operator of this section places a small indicator or diamond shaped flag at the end of the bundle, as indicated in Figure 20 of the drawings. This is necessary because the wrapping operation is a continuous operation and the paper would conceal the joints between the contacting ends of adjacent bundles. It is necessary then to use some kind of indicator whereby an operator may know the exact part of the continuous wrapped lumber ribbon at which to use a knife to sever the wrapped bundles from each other. The bundle thus provided with the indicator or flag is passed into control of the roller in section No. 3, and by these rollers is fed toward section No. 4 and through the wrapping mechanism.

Section No. 3 includes at least three horizontal rollers which may be rotated at any desired speed by a friction drive similar to that previously described. This section comprises a frame 171 on which adjusting mechanism for the upper horizontal and vertical rollers is mounted. Interposed between two of the sets of rollers is a rectangular frame comprising standards 172 and 173 connected by a cross head 174 and a strut 175. Supported in the frame 171 are five rollers 176 having V-shaped edges engaging a V-shaped groove 177 in a large ring gear 178 which meshes with a drive pinion 179 journaled in the frame 171 to rotate the said ring gear.

The pinion 179 is rotated by a sprocket 180 fixed to the shaft 181 on which the said pinion is mounted. The sprocket 180 is connected by a chain 182 to a sprocket 183 which is preferably driven by the friction drive controlling the rotation of the lower set of horizontal rollers of section No. 3. It is essential that a chain and sprocket drive or any suitable positive drive be used for this purpose so that there may be no slipping and so that the ring gear may be rotated at a rate properly proportioned to the horizontal feed of the bundle B of lumber, shown in Figure 16, as passing between the vertical rollers.

Figure 18:
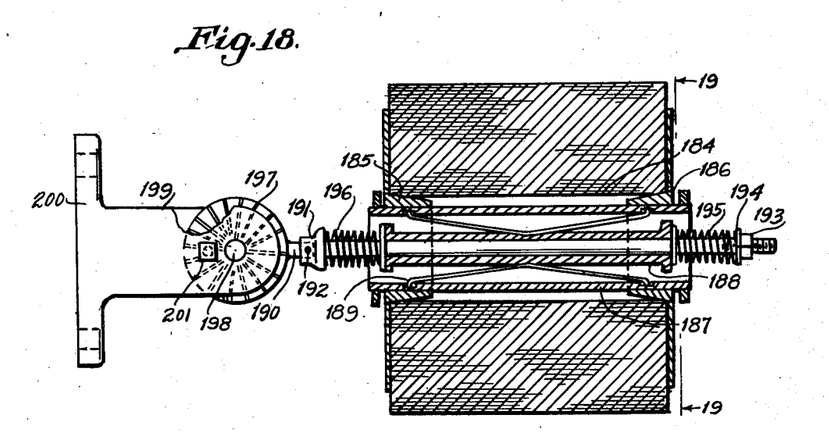
Figure 18 is a section taken on the line 18—18 of Figure 15.
Figure 19:
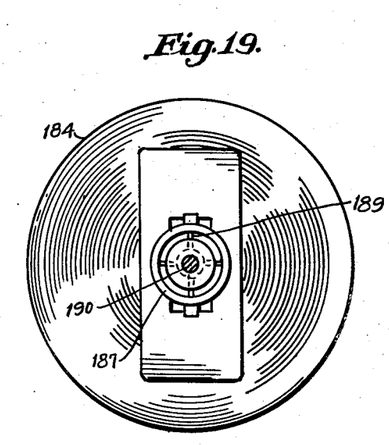
Figure 19 is an end elevation of a hub adapted to be secured to a rotary ring gear of this apparatus for the purpose of supporting a roll of paper and carrying it around the bundle of material to be wrapped.

As the bundle passes through section No. 3 to section No. 4 it is wrapped with paper or other suitable material from a roll 184. This roll 184 is shown in Figure 18 of the drawings as mounted on tapered wood or metal ferrules 185 and 186 which are slidably mounted on a cylinder 187 with sufficient friction to hold them in any position on the cylinder 187 to which they may be adjusted. The cylinder 187 is yieldingly mounted on a sleeve 188 by arcuate springs 189 having their out-turned ends seated in recesses suitably formed in the cylinder 187 and bent to engage in recesses formed around the periphery of the sleeve 188 and parallel to the axis of said sleeve.

The sleeve 188 is slidably mounted on a rod 190 having a shoulder either formed integrally thereon or by means of a sliding collar 191, which may be secured to the rod 190 by a set screw 192. The other end of the rod 190 is screw-threaded and a nut 193 is threaded thereon to press against a washer 194 forming an abutment for a coil spring 195 interposed between said washer and the outwardly flanged end of the sleeve 188. A spring 196, similar to spring 195, is interposed between the collar 191 and the other outwardly flanged end of the sleeve 188. The mounting just described permits the roll 184 to yield both lengthwise and radially in its movements on the rod 190, in order to accommodate itself to any inequalities either in the dimensions or the movements of the bundles being wrapped or in the gearing which is performing the wrapping function.

The rod 190 terminates at one end in a flat disk 197 serrated radially and centrally apertured to receive a pivot bolt 198 for pivotally connecting rod 190 to the outwardly extending arm 199 of a bracket having a base plate 200 suitably apertured to receive bolts or machine screws for the purpose of connecting the bracket and the rod 190 to the rim of the rotating ring gear 178. A set screw 201 may be used to clamp the rod 190 in any desired position of angular adjustment on the arm 199 and in accordance with the angle at which the wrapping material 184 is to be wrapped around the bundle B.

Figure 15:
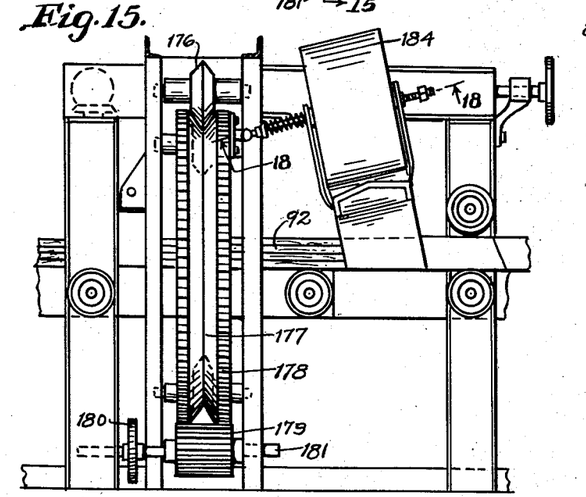
Figure 15 is a longitudinal vertical section taken on the line 15—15 of Figure 14.

In Figure 15 of the drawings, I have shown the roll of wrapping material 184 inclined outwardly from the center of the ring gear 178. This bundle may be arranged, however, on the opposite face of the wheel and inclined inwardly; that is, toward the center of the ring gear. This would materially reduce the distance between the roll of paper and the point of contact of the bundle being wrapped, and would bring nearer the center of the surface of the ring gear to reduce the centrifugal force encountered through inclining it in the other direction and on the other side of the ring gear.

To crimp the edges of the paper, as it is wrapped around the bundle B, a special crimping device is rotatably mounted on the cylinder 187. This crimping device comprises a trough-like member of sheet material having arms 202 and 203 extending on opposite sides of the roll 184 and apertured at their outer ends to fit snugly over the ends of the cylinder 187 where they project beyond the friction washers 185 and 186.

The other end of the arms 202 and 203 are connected by a plate 204 which serves as a base along which the sheet 205 of paper may be fed around the material to be wrapped. The edges of the arms 202 and 203 extend as flanges upwardly from the plate 204 and are bent over toward the center of said plate in order to form crimping flanges for turning the edges of the paper 205 slightly inwardly to form reinforcing crimps. The upturned edges of the arms 202 and 203 approach the plate 204 more closely as they extend towards the free end of the crimping plate; and a hump 206 is formed across the base plate 204 at the lower ends of the crimping flanges to cause the crimped edges to lie flat on the sheet as it is fed around the moving bundle.

Figure 22:
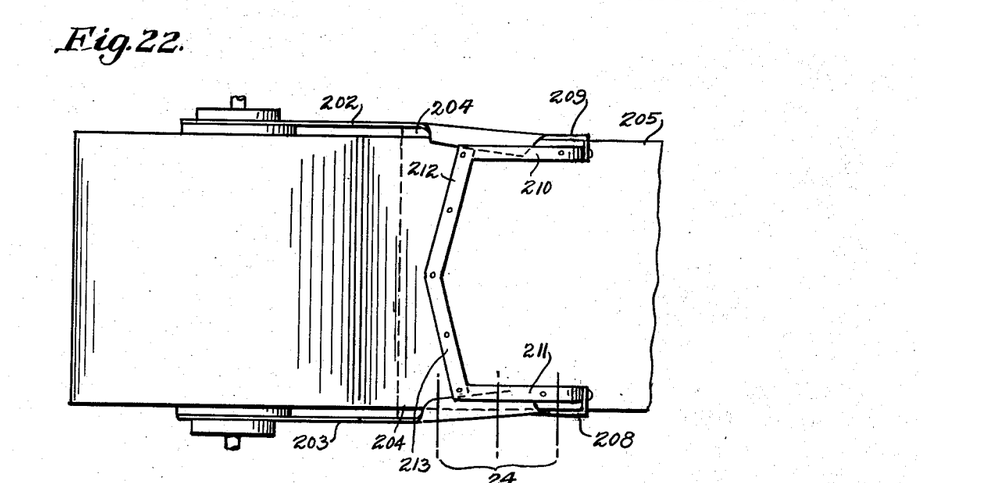
Figure 22 is a fragmentary side elevation to an enlarged scale of paper crimping mechanism adapted to be connected to the paper carrying roller for the purpose of forming a crimp along each edge of the paper as it is fed around a bundle being wrapped.
Figures 23, 24:
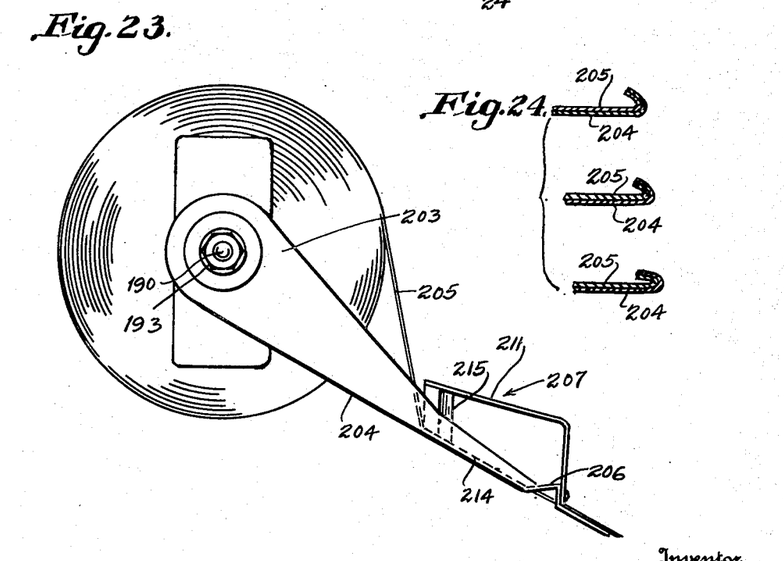
Figure 23 is a side elevation of the mechanism shown in Figure 22.
Figure 24 illustrates fragmentary sections of part of the crimping mechanism shown in Figures 22 and 23.
Figure 25:
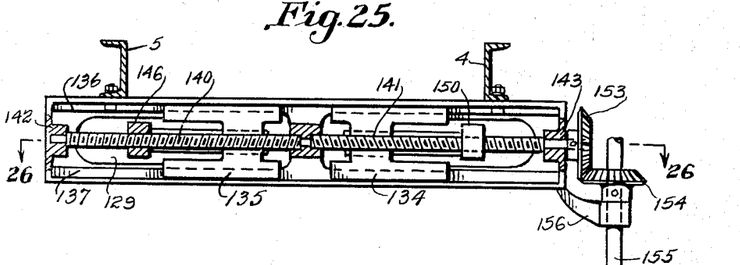
Figure 25 is a horizontal section illustrating the means for adjustably supporting the pairs of laterally adjustable vertical rollers for engaging the sides of a bundle being wrapped by this machine.
Figure 26:
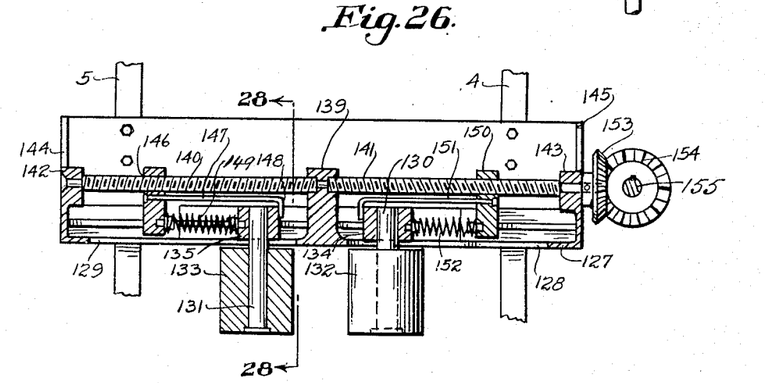
Figure 26 is a vertical section taken on the line 26—26 of Figure 25.
Figure 27:
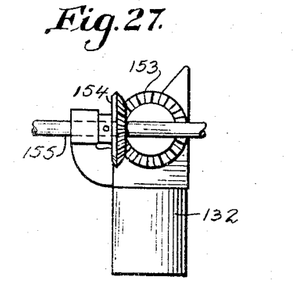
Figure 27 is an end view taken from the right of the mechanism illustrated in Figure 25 of the drawings.
Figure 28:
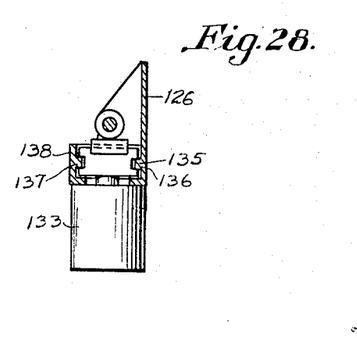
Figure 28 is a vertical transverse section taken on the line 28—28 of Figure 26.

As shown in Figures 22 and 23, a spring 207 is secured to the crimping attachment at the lower end thereof. This may be made of any suitable material; and, as shown, comprises a pair of legs 208 and 209 suitably secured to the sides 202 and 203, respectively, of the crimping attachment. These legs extend upwardly, as shown in Figure 23, and connect with arms 210 and 211, respectively. These arms extend rearwardly of the plate 204 and terminate in two arms 212 and 213 which meet directly over the center line of feed of the paper and are equally inclined to the arms 210 and 211.

A plate or board 214 of fiber board or other suitable material is secured to the lower faces of the arms 212 and 213 by means of a spacer 215 and is shaped to the same angle as that existing between the arms 212 and 213. This fiber board 214 lies in yielding contact with the upper face of the paper and holds the paper flat against the plate 204 to prevent wrinkling and to ensure the edges of the paper being turned over by the crimping flanges. This board 214 conforms exactly to the inside dimensions of the crimping device; it extends to each edge of the device and its edges are tapered off from the back edge toward the center. The tapered edges become sharper as the crimping flanges decrease in angularity, and the width of the board also decreases in conformity with the decrease in width of the crimping device. It makes complete contact with the paper where the latter moves within the bounds of the crimping device and maintains this contact to the beginning of the hump 206.

The top end of the board 214 is flat V-shaped, with the point of the V exactly in the center of the paper. This construction causes the paper to flow evenly to each side of the crimping device and into even contact with the opposite crimping flanges.

Section No. 4 of the apparatus is nothing more than a receiving platform on which the continuous wrapped lumber ribbon may be severed into sections. As shown in this case, section No. 4 does include a series of power driven lower rollers similar to the rollers 48, and a series of upper rollers similar to the rollers 93 for feeding the wrapped lumber over a printing cylinder 216. The cylinder 216 is journaled in the frame work at the height necessary for the periphery of the cylinder to make printing contact with the moving packages of lumber. There is nothing novel in the details of this printing mechanism, since it may take any desired form and there are many of these forms in common use in all arts.

The method of applying the flags, or indicators 217, is illustrated in Figure 20 of the drawings. These flags or indicators may be made of some thin springy material so that the part protruding above the upper face of the package will spring to upright position, even after being pressed down by contact with any of the upper rollers during the progress of the lumber package through the apparatus. Preferably, these flags are square or diamond shape, and each may have one of its corners bent so that it can be readily inserted between two layers of the packaged material or stuck into the end of the package and so that part of it may project above the upper face of the package. Of course, after the packages are severed the flags may be removed from the package and sent forward to the operator of section No. 2 to be used again. During the passage of the lumber through section No. 3, the operator may pass a ribbon of adhesive material over the flags and around the joint between adjacent sections.

Operation

Among the first things to be done are to prepare for printing the packages. Rubber figures and numerals of the required sizes and numbers having been secured these are affixed in their proper arrangement with an adhesive like shellac to a piece of canvas, or a like substance, which is in turn affixed with an adhesive to the face of the printing wheel provided for that purpose in the bed of the machine at the feed-out end. The receptacle through which the wheel revolves is filled with the desired ink, and this feature is in readiness for operation. When done with the canvas is pulled off the wheel and the operation repeated as desired.

A spindle is loaded with paper, cellophane, or any other desired material, the material threaded through the crimping attachment, and the spindle bolted on the paper carriage and adjusted to the angle at which when the material on it is unwound on the bundle to be wrapped complete coverage will be had, plus the lap desired. The nut on the end of the spindle is adjusted against the spring between it and the paper so as to provide such tension or friction on the bundle of paper as will cause the paper to feed off with some resistance and so draw taut the paper as it is wound about the bundle, thus making a tight package. Additional spindles are loaded and held in reserve to be likewise bolted to the carriage as the wrapping material on the preceding one is exhausted.

All top and side pressure rollers are now adjusted so as to accommodate the dimensions of the material to be wrapped. This adjustment is easily and rapidly made through manipulation of the hand wheels provided for that purpose. It is desirable that considerable pressure be exerted against every exposed face of the items to be wrapped so that they will not change their relative positions during their progress through the machine up to the carriage where the wrapping takes place, and that at the same time no friction be occasioned, which would cause the slippage backwards of some pieces in the bundle and thus annul the advantage of having butted one end against the metal stops, or "bumpers", and equalized or trimmed the other. In order to obtain this pressure, and at the same time avoid friction, each roller is provided with roller bearings, and each roller is immediately supported on springs.

Assuming that the first items to be wrapped are pieces of lumber 1″ thick (##″ dressed or finished size) by 6″ wide (5¼″ dressed or finished size), four pieces to the bundle, the top rollers (all except the first, or "live" one) are set 3″ above the highest point of the bottom rolls, and the side rolls are set 4″ apart. Thus the clearance between the rollers, which clearance need not be exact, is less than the overall measurements of the group to be wrapped. When the group, or individual pieces of it, are fed into the rollers by the top "live" roller, or by exertion of the bottom rollers, all of which are "live" the top and side rollers being supported on springs are opened up by contact of the front end of the advancing piece or pieces with the face of the roller at a point between its face and its axis. So we have pressure without friction permitting of the free movement throughout the length of the machine of groups of items without the first positions assigned to them being changed in the slightest.

The machine being "set" the motor which drives it is started up by any one of the three operators, each of whom is provided with a starting button for that purpose. (When the machine is started the saw located at its feed-in end is also started. This saw is of the swing type.) All friction drives for the live rollers throughout the machine are put in contact so that all of the "live" rolls, that is all of the bottom rolls and the front top roll, are put into motion. A dummy piece or bundle is fed into the machine, a piece or bundle of about the same dimensions as these to follow. It is advanced through the machine to a point where approximately two-thirds of its length have passed through the wheel, or paper carriage, and then all friction drives are disengaged except the one propelling the front top roll. The only parts of the machine which are now in motion are the front top roll and the saw, and a bundle now rests in the machine about two-thirds way through the carrier wheel.

The material to be wrapped is now available at the feed-in ends of the machine, brought there either on buggies, or dollies, or by conveyor. The front end operator by inspection of the available materials determines the length of the first bundle to be made up. He reaches overhead and releases the cord or wire which connects with the bell crank over the bumper at the place determined on as being the length of the first bundle. Say this bundle is to be twelve feet long. When the cord connecting with the bell crank over the twelve foot bumper is released by pulling the ring in the operator's end of the cord from off a hook or nail over which it had been previously placed, the twelve foot gate, or bumper, falls into position.

Now this front end operator feeds into the machine a piece which the rubber covered top live roll immediately takes hold of and advances against the bumper. In the meantime, the operator has in readiness another piece to feed in, and again the top live roll takes hold of it and advances it over the first piece fed in; that is, slides it over the first piece until its front end also is in contact with the twelve foot bumper, and so on until the required number of pieces are gotten into the machine. The friction drive which actuates the front, top, live roll is disengaged and the operator swings the saw across the exposed end of the bundle, thus equalizing it. The saw is allowed to drop back into its concealed position and the front end operator, by putting into motion the bottom live rolls under his control, advances the bundle into the control of the middle operator and stops his section of rolls. The bundle is considered to be within the control of the middle operator just as soon as its front end passes over the first bottom live roll in his section. By engaging his friction drive, the middle operator now advances the bundle to within his reach and inserts a flag in its front end. (It should have been previously stated that the dummy bundle when first inserted and before it was stopped with a part of its length extending behind the carrier wheel, was not stopped until it has passed out of the zone of influence of the second section of rolls. It has been stopped only when it is in the zone of the third section, and hence the advancing of the second bundle does not affect it.)

Now the operator advances the second bundle, with the flag in position, into contact with the dummy bundle and stops it. Here it must be noted that the middle operator on only one of whose live rolls the second bundle was left resting by the first operator before he stopped his first section of rolls, has, by starting up his second section pulled the bundle out of the first section where most of it was resting. This is made possible only through employment of the roller clutches with which each live roll is driven. Through the employment of these roller clutches the whole live roller system is made as flexible as the human hands. If the second section of rollers is idle the operator of the first section can pass into it a bundle as far as he wishes, and at any speed at which he wishes, or if the second section is being operated at a slow speed the operator of the first section can pass into it a bundle at any higher speed which he elects to. On the other hand, if the operator of the first section passes into the zone of control of the operator a bundle at slow speed which the middle operator is needing for feeding into the carrier wheel in order to prevent interruption of the wrapping process, the second operator can "snatch" it away from the first operator, as soon as it has come under his first roll, and advance it as rapidly as he wishes to, the fact that the rolls under the control of the first operator are being operated at a slower speed than those under the control of the second operator does not operate to hold back the bundle. All live rolls can be "pushed" forward at a speed higher than that at which they are being driven, or a load can be pulled over them at any speed higher than that at which they are being driven.

The second operator now puts the paper carrying wheel into motion by engaging the friction drive which drives it and grasps the free end of the paper and holds it against the dummy bundle now advancing. Wrapping has now commenced and is continuous. By this time the first operator has prepared a second bundle which he promptly passes to the second operator. The second operator advances the front end of the second bundle to within his reach, inserts the flag, and as soon as the bundle ahead has passed out of the grasp of the second section of rollers he butts the second bundle against it and steps around to the other side, or feed-out side of the carrier wheel, and there passes around the point of juncture of the two bundles, which is indicated by the flag, a gummed strip of tape about three inches wide.

This gummed tape may be of any suitable substance, such as paper, cellophane, or the like, provided that it is strong enough to answer the desired purpose, which is that of binding the wrapper, and it should be of an attractive color. This tape is carried on a reel such as is in general use, and the gummed face of it is moistened by drawing over a roller which revolves in water, all of which is common equipment and practice. The reel of tape is, of course, placed within easy reach of the operator. The tape is torn from the reel, or cut by the usual means, as wanted, in lengths approximating the circumference of the bundle around which it is to be fastened. The operator selects approximately the center of the length and width of the tape and forces it over the flag and bends the loose ends around the circumference of the bundle, where it adheres. This operation of applying a tape around the circumference of the bundle is performed where the front end of the first bundle makes contact with the dummy bundle.

The now endless bundle advances to the third and last operator at the feed-out end of the machine, and over the printing wheel. The last operator, who is provided with a long, thin, sharp knife severs the bundle at and directly in front of the flags and approximately through the middle of the tape, thus leaving one-half of the width of the tape on an end of each of two bundles. Each end of each bundle is thus securely bound. In order to permit of the insertion of the knife of the third operator between the ends of the bundles, one of the rollers in the last section of the feed-out end is elevated slightly above the plane of the others, thus creating a hump which serves to slightly separate the ends of the bundles. This hump need be only very slight.

The first operator continues making up bundles by placing the ends of their components between the front, top and bottom rolls, the latter of which is continuously in motion except when stopped during the process of equalization. This roll has constant contact with any object between it and the roll under it by reason of its own weight. It works in grooves without support and rises as the thickness of the package under it is increased. It is necessary that this first operator select pieces of approximately identical lengths for the composition of each bundle. His first bundle was twelve feet long, and we have seen how be dropped his twelve foot stop, or bumper. If the next bundle is to be sixteen feet long the operator, by reaching overhead and grasping the ring in the end of the line which connects with the bell crank over the twelve foot bumper and pulling down on it, passes the ring over the head of a nail which protrudes about an inch from the face of a board directly over his head raises the twelve foot stop. He lowers the sixteen foot stop in the same manner in which he previously lowered the twelve foot one. As fast as a bundle is made up and equalized it is sent forward to the middle operator who, in due course, inserts a flag, affixes a cuff, and forwards the bundles on to the third operator, over the printing device. The third operator severs the bundles, removes the flags, which he returns to the middle operator from time to time for reuse, and aids in passing the bundled, wrapped, bound and printed package to whoever is to receive it, preferably directly into a car for shipment.

It is recognized that demand might arise for capping the ends of wrapped packages. This can be readily accomplished by providing the middle operator with suitable caps to be slipped over the ends of the bundles, or he can be provided with lengths of material, the ends of which are affixed with an adhesive to the top and bottom faces of the material passing over the end of the bundled items. The middle operator, if provided with suitable material of the same width as that of the bundle, and an inch or two longer than the thickness of the bundle, gummed on one side, or at each end on one side, can by sticking one end on the top face of the bundle about an inch or a half inch from its end, pass the material over the end of the bundle and affix the other end to the under face of the bundle, thus closing the end with a piece of material bent U-shape with one of its ends glued to the top face of the bundle and the other glued to the under face. If it is desirable to indicate the contents of the bundle on its end so that it can be identified when in pile, a rubber stamp can be impressed on the exposed surface of this U-shaped end closure, or the desired markings can be made on this end closure with a pencil.

If for any reason the supply of stock being wrapped is interrupted the entire machine should be immediately brought to a stop before clearing it; that is, before all of the bundles in it are run through, because if the machine is cleared the continuous process of wrapping is broken and in order to start off again another dummy must first be fed in. It might be noted that this dummy can, and in fact, should be of the same materials as are to be wrapped. When the dummy is fed out of the discharge end of the machine it should be returned to the first operator to be put through the machine in due course, and wrapped and utilized.

When changing from bundles of one dimension to another, there is no necessity for discontinuing the wrapping process. If there is material variation in the dimensions of the bundles, proportionate readjustment of the top and side pressure rolls might be necessary, but these can be affected so quickly and readily that no break in the wrapping proceeding is necessary.

What I claim is:

1. In wrapping apparatus, a supporting frame, a horizontal table thereon, a series of stops spaced along said frame and movable toward and from said table, means for raising any of said stops from contact with said table, means for moving an elongated artitcle into contact with any of said stops, means for cutting off said article a predetermined distance from said stop, and means for winding a sheet of material around said article during the movement thereof beyond said stop.

2. In wrapping apparatus, a supporting frame, a horizontal table supported by said frame, means for moving an elongated article through a predetermined distance along said table from one end of the frame, means for severing any part of said article projecting from the end of said frame, means for moving the severed article through said frame, and means for winding a sheet of material around the severed article during the last named movement thereof.

3. In wrapping apparatus, a supporting frame, a horizontal table thereon, means for moving elongated articles through a predetermined distance along said table from one end of said frame, means for severing any part of said articles projecting beyond said end for forming elongated bundles of predetermined lengths, means for moving each of said bundles bodily in one direction through said frame, means rotatable transversely of said frame and surrounding the bundles moving lengthwise thereof for winding a sheet of wrapping material around said bundles during the said movement thereof.

4. In wrapping apparatus, a supporting frame, a horizontal table thereon, means for moving elongated articles through a predetermined distance along said table from one end of said frame, means for severing any part of said articles projecting beyond said end for forming elongated bundles of predetermined lengths, means for moving each of said bundles bodily in one direction through said frame, means rotatable transversely of said frame and surrounding the bundles moving lengthwise thereof for winding a sheet of wrapping material around said bundles during the said movement thereof, and means for folding the edges of said material during the winding operation.

GEORGE C. HAMILTON.